| United States Patent [19] | [11] Patent Number: 4,615,990 |
| Richon et al. | [45] Date of Patent: Oct. 7, 1986 |

[54] SILICON NITRIDE SINTERED BODIES AND A METHOD FOR THEIR PRODUCTION

[75] Inventors: Dominique Richon, Ville La Grand, France; Olivier de Pous, Geneva, Switzerland

[73] Assignee: Battelle Memorial Institute, Geneva, Switzerland

[21] Appl. No.: 777,071

[22] Filed: Sep. 17, 1985

[30] Foreign Application Priority Data

Sep. 19, 1984 [EP] European Pat. Off. ........ 84810458.4

[51] Int. Cl.$^4$ ............................................ C04B 35/52
[52] U.S. Cl. ........................................ 501/92; 501/97; 501/128; 501/119; 264/60; 264/65; 264/125; 264/332
[58] Field of Search ...................... 501/96, 97, 98, 128, 501/119, 92, 88; 264/56, 60, 65, 125, 332

[56] References Cited

U.S. PATENT DOCUMENTS

| 4,407,970 | 10/1983 | Komatsu et al. | 501/97 |
| 4,412,008 | 10/1983 | Miyamoto et al. | 501/97 |
| 4,412,009 | 10/1983 | Komatsu et al. | 501/97 |
| 4,492,765 | 1/1985 | Buljan | 501/97 |
| 4,558,018 | 12/1985 | Matsuhiro et al. | 501/97 |

*Primary Examiner*—Stephen J. Lechert, Jr.
*Attorney, Agent, or Firm*—Cushman, Darby & Cushman

[57] ABSTRACT

Silicon nitride sintered bodies which contain no more than 15% by weight metallic non-oxide compounds as silicon nitride high temperature grain growth inhibitors and total amount of 4–25% of MgO and $Al_2O_3$ as densifying aids in MgO/$Al_2O_3$ weight ratio being 19 to 2.

4 Claims, No Drawings

SILICON NITRIDE SINTERED BODIES AND A METHOD FOR THEIR PRODUCTION

This invention relates to silicon nitride sintered bodies resulting from the sintering of a raw material or powder composition based on $Si_3N_4$ enabling sintered objects to be prepared by pressureless sintering. The invention also relates to the method for the manufacture of articles of silicon nitride by pressureless sintering of the above-mentioned raw material powder.

Silicon nitride is known to be a very hard material which is suitable for manufacturing parts having high mechanical strength at high temperature (shafts, gas turbine blades, parts in contact with liquid metals, block bearings, ball bearings, sealing segments etc.), provided its degree of porosity is low. In this respect, the higher the degree of porosity of this material, the less it resists breakage forces and hot oxidation corrosion. A $Si_3N_4$ of very low porosity can be manufactured which is suitable for the aforesaid applications by hot uniaxial pressing. By this method, compact $Si_3N_4$ is obtained in the form of blocks, which are very costly to convert into complex mechanical parts because of the extreme hardness of the material, the special tools (diamond clad) required for their machining, and the slowness of this work. Thus, an active attempt has been made during recent years to directly form parts by molding or stamping powder compositions based on $Si_3N_4$ followed by sintering at high temperature under an inert atmosphere. In doing this, the following three basic factors have proved important: the addition of densification aids, the use of powders of fine particle size (of the order of 1 to a few um) and, during sintering the use of a relatively high nitrogen pressure of the order of 2 to 50 atmospheres. By means of these improvements, densification levels of the order of 95 to 97% of the theoretical density are now achieved (3.03–3.097 g/cm$^3$).

The most important publications in this field include, for example: I. ODA, M. KANENO and N. YAMAMOTO, "Pressureless sintered silicon nitride" Nitrogen Ceramics, ed. F. L. RILEY, Nordhoff (Leyden) 1977, 359–365; M. MITOMO et al., Yogyo Kyokai Shi 1976, 84(8), 356–360 (Japan); Japan J. Mater, Sci 1976, 11(6), 1103–7; Japanese Kokai patent specification No. 77 47,015; M. MITOMO et al., Yogyo Kyokai Shi 1977, 85(8), 408–12; G. R. TERWILLIGER & F. F. LANGE, Journal of Materials Science 10 (1975) 1169–1174; U.S. Pat. No. 3,992,497 and "Sintering of silicon nitride" by D. J. ROWCLIFFE & P. J. JORGENSEN, Stanford Research Institute, Menlo Park, Calif.

The most common densification aids include MgO (5%); $Al_2O_3+Y_2O_3$(10–50%); BeO(1.25%)+MgO(3.75%); BeO(1.25%)+MgO(3.75%)+$CeO_2$(5%), etc. Recently, excellent results were obtained by using, as densification aid a sub-micronic particulate mixture of MgO:$Al_2O_3$ in a weight ratio of 10:1 to 1:3 (see GB-A-No. 2.035.981).

Despite the excellent results on maximal densities and flexural strength (in the order of 400 MPa at 1400° C.) obtained by applying the recently developped techniques of the prior-art, some difficulties still remain in connection with the structural stability of the ceramic material under high temperature applications (for instance high temperature turbine blades). These difficulties mainly affect density changes, α- to β-phase conversion, further grain growth and flexural strength losses at high temperature.

Attempts have been made to remedy these drawbacks by the addition to the $Si_3N_4$ compositions of non-oxide metal compounds such as SiC, TiC, WC, TiN and $TiB_2$ with the expectation that such material can act as grain growth inhibitors and prevent or minimize the oxidation of $Si_3N_4$ to $SiO_2$ under heating. Thus, for instance, Japanese Kokai Nos. 81-32377 (79-104 927) discloses a sintered silicon nitride material for cutting tools having the following composition: 5 to 40 weight % of one or more of carbide, nitride or carbo-nitride of titanium; 10 weight % or less of one or more of aluminum nitride, aluminum oxide, magnesium oxide, silicon oxide, and oxides of Fe, Co, Ni, and rare earth metals.

Japanese Kokai Nos. 82-123865 (81-16589) discloses a method for making a dense silicon nitride sintered body containing TiN and/or AlN and oxides such as $Y_2O_3$, $Al_2O_3$, MgO, $ZrO_2$, $TiO_2$, BeO, $La_2O_3$ and $CeO_2$.

Japanese Kokai Nos. 82-129875 (81-16589) discloses a tool for working copper and copper alloys made of a ceramic containing $Si_3N_4$, 1 to 40 wt% of one or more of AlN, $Al_2O_3$, $Y_2O_3$, MgO, CaO, $ZnO_2$, $TiO_2$, $HfO_2$, SiC, CeO, BeO, TiN, $Mg_2N_3$, Al, etc., and also a tool containing $Si_3N_4$ and 20 wt% or less of WC and/or $Mo_3C$ relative to the $Si_3N_4$.

Japanese Kokai Nos. 82-188467 (81-73814) discloses a silicon nitride based sintering composition comprising 70 to 97 wt% of silicon nitride, 1 to 20 wt% of titanium nitride, and 2 to 20 wt% of an oxide of rare earth metals.

Japanese Kokai Nos. 82-205376 (81-89330) discloses a dense sintering composition for a cutting tool, comprising $Si_3N_4$ and $Al_2O_3$ in a ratio of 50/50 to 90/10, $Si_3N_4$ containing 1 to 15 wt% of one or more of $Y_2O_3$, MgO, $ZrO_3$, and stabilized $ZrO_2$; and $Al_2O_3$ containing 10 to 50 wt% of two or more of TiC, TiN and TiCN. The reference also discloses a process for producing a sintering composition for making cutting tools, characterized by (a) mixing (i) a powder of $Si_3N_4$ consisting of 90 wt% or more of α-phase $Si_3N_4$ and containing 1 to 15 wt% of one or more of $Y_2O_3$, MgO, $ZrO_2$, and stabilized $ZrO_2$, and (ii) a powder of $Al_2O_3$ containing 10 to 50 wt% of two or more of TiC, TiN, and TiCN, $Si_3N_4$ and $Al_2O_3$ being in the ratio of 50/50 to 90/10, and (b) sintering under pressure at a high temperature to the density of 97 to 100% of the theoretical density.

Japanese Kokai Nos. 82-207136 (81-92568) discloses a process for producing a sintering composition for a cutting tool involving (a) mixing (i) 20 to 40 wt% of A Ti-containing powder containing $TiO_2$ and/or Ti, and TiC in the ratio of 5:95 to 20:80, (ii) 10 to 50 wt% of an $Al_2O_3$-based powder comprising 60 to 80 wt% of $Al_2O_3$, and (iii) 50 to 90 wt% of an $Si_3N_4$-based powder containing 1 to 15 wt% of one or more of $Y_2O_3$, MgO, $ZrO_2$, and stabilized $ZrO_2$, and (b) sintering under pressure at a high temperature to the density of 97 to 100% of the theoretical density. In a modification of the above, 50% or less of TiC is replaced by TiN, WC, TaC, $Mo_2C$, or NbC.

Japanese Kokai Nos. 83-20782 (81-118239) discloses a silicon nitride sintering powder containing (a) 95 to 70 wt% of silicon nitride containing more than 80 wt% of α-silicon nitride and having a content of oxygen of 5 wt% or less, (b) 2 to 20 wt% of at least one of oxide powder such as $Y_2O_3$, $Sc_2O_3$, $La_2O_3$, $Ce_2O_3$, $Al_2O_3$, $Cr_2O_3$, MgO, and (c) 0.5 to 20 wt% of one or more powders selected from oxides, nitrides, carbides and borides of elements in the groups 4B, 5B, 6B of the Periodic Table, B$_4$C, and Al$_4$C. The reference further discloses a silicon nitride sintering product according to claim 1 having an electrical conductivity of more than $10^{-3}\Omega^{-1}\text{cm}^{-1}$ and being machinable by electroerosion.

Japanese Kokai Nos. 83-60677 (81-155453) discloses a process for producing a hard sintered silicon nitride article by mixing (i) 95 to 57 wt% of metal silicon powder having a maximum particle size of 25 um or less, (ii) 1 to 15 wt% based on TiN of a titanium ingredient powder capable of becoming TiN during the sintering reaction or a TiN powder having a maximum particle size of 20 μm or less, and (iii) 2 to 28 wt% of one or more compounds selected from AlN, Al$_2$O$_3$, SiO$_2$, and oxides of rare earth metals; shaping the mixture, reaction sintering in an nonoxidizing atmosphere of nitrogen or a gas mixture containing nitrogen, and then sintering again at 1600° C. to 2000° C. under the same atmosphere as above.

Japanese Kokai Nos. 83-74572 (82-134446) discloses a tool for working copper and copper alloys, comprising (i) 60 wt% or more of Si$_3$N$_4$, (ii) 1 to 25 wt% of one or more of oxides, carbides, borides, nitrides or silicides of the elements of the IIIB group in the Periodic Table, and (iii) 1 to 25 wt% of one of Al, Al$_2$O$_3$ and AlN; and having pores of 5% or less.

Japanese Kokai Nos. 83-95644 (81-190186) discloses a high strength complex sintering composition comprising (i) silicon nitride, (ii) 20 to 75 wt% of one or more of metal nitrides and carbides such as titanium nitride, zirconium nitride, zirconium carbide, vanadium carbide, and (iii) 10 wt% or less of one or more of aluminum oxide, magnesium oxide and oxides of rare earth metals.

Japanese Kokai Nos. 83-161975 (82-41916) discloses silicon nitride based workpieces containing TiN, aluminum nitride together with Al$_2$O$_3$, Y$_2$O$_3$ and/or SiO$_2$ and/or rare earths. For instance, silicon nitride in an amount 70-97.5 wt%, TiN powder in an amount of 0.5-15 wt% and a mixture of at least one of AlN, Al$_2$O$_3$ and SiO$_2$ and one or more of Y$_2$O$_3$ and oxides of rare earths in an amount of 2-20 wt% are mixed and moulded and burnt in a non-oxidative gaseous atmosphere (N$_2$). TiN makes the grains of the sintered body very small and heightens the strength of the body at high temperature. The structure of the sintered body is fibriform and has high strength and tenacity at high temperature when used for parts of gas turbines.

The present inventors have now found that the above advantages can still be markedly transcended with the sintered bodies defined in claim 1 containing Si$_3$N$_4$ in conjunction with SiC, TiC, WC, TiN and TiB$_2$, the quantity of such metallic compounds being defined in claim 1 and, as densifying additives MgO and Al$_2$O$_3$ in quantities and particles size as defined also in claim 1.

Compositions more or less closely related to the aforementioned definition have been disclosed recently as outlined below:

For instance GB-A-No. 2.062.688 discloses powders for the cold pressing and sintering of Si$_3$N$_4$ tools; such powders may contain simultaneously Si$_3$N$_4$, MgO, Al$_2$O$_3$ and WC or TiC like in the composition of the present invention, but the proportions given in the latter are not recited in the reference. Further, no example in the reference recites simultaneously Si$_3$N$_4$, MgO and Al$_2$O$_3$ together with the heavy metal compound.

U.S. Pat. No. 4,004,937 discloses a silicon nitride ceramic obtained by the pressureless sintering of a powder containing, in addition to Si$_3$N$_4$, MgO and Al$_2$O$_3$ in a ratio sufficient to form a spinel-like type of compound. No additional ingredient selected from TiN, WC, TiC and TiB$_2$ is however recited.

EP-A-No. 79678 discloses the three stage sintering of silicon nitride bodies (the third stage involving hot pressing) using a Si$_3$N$_4$ powder containing at least one metal oxide and at least one nitride or carbide of IVa, Va or VIa metals. Such definition includes the components mentioned in claim 1 of the present invention; however, the relative proportions of the ingredients as indicated in claim 1 of the instant application are not recited in the reference.

EP-A-No. 100380 discloses tools made of sintered Si$_3$N$_4$ which, from the width of the definition, might comprise Al$_2$O$_3$, MgO and one of SiC, WC and TiN. In the examples 1 to 10, typical sintering compositions are given, however none of them containing the aforementioned contemplated combination. Furthermore, according to the definitions of the proportions of respective components given at page 4, third paragraph, under sections (1) to (4), it may be safely assumed that in none of the four aforementioned alternatives the specific proportions given in claim 1 of the present application are suggested.

Preferably, in the present bodies compositions, the amount of MgO in the sintered bodies defined in claim 2 is 5 to 15% by weight and the amount of Al$_2$O$_3$ is 0.5 to 6% by weight. Other preferably used ratios of ingredients are defined in claim 2.

After milling the particle size of the various ingredients is preferably in the 0.01 to 0.5 μm range.

The type of Si$_3$N$_4$ used for making present sintered articles is preferably the α-type. During sintering the α-form converts itself to the β-form; the extent of formation is an indication of the effectiveness of the sintering additives including the metallic non-oxide compounds.

For making a sintered object the various ingredients selected in powder form are mixed and, if particle size requires it, are ground in a ball-mill until the desired particle size is attained. Grinding solvents can be water or organic solvents such as various fractions of petroleum (for instance light petroleum) and/or lower alcohols (for instance tert-butanol). Milling balls are preferably Si$_3$N$_4$ balls as no further material other than the basic silicon nitride from the balls is introduced during milling. However when desired, other milling materials such as alumina balls and mill can also be used.

Then when the granulation of the particles is in the desired state, the following stages are preferably performed:

(a) the powder is compacted in the cold state into the form of the desired object, (b) this molded object is subjected in its cold state to an isostatic pressure exceeding 1 T/cm$^2$, (c) the object is heated under reduced pressure in order to degas it, (d) the object is heated between 1650° and 1830° C. under an essentially nitrogen atmosphere, this latter operation giving rise to the required sintering and densification.

This method is extremely advantageous, because by taking account of the contraction during densification (of the order of 40 to 60% by volume) the object can be formed of approximately the required proportions, for example by moulding or stamping, so enabling further machining to be reduced to a strict minimum. It is also possible to grind the part before sintering (green machining) or after pre-sintering below 1300° C.

Preferably, after stage (a), which is carried out by the usual known means, stage (b) is carried out at 2 T/cm². To attain this, the molded object can for example be wrapped in a flexible plastic sheet and the whole subjected to a hydrostatic pressure by means of a liquid such as oil in a suitable press. Alternatively, the object can be molded in a rubber mold, the mold then being pressed in a piston press, the forces due to the pressure then becoming distributed uniformly in all directions by way of the material constituting the mold. After cold pressing and removal from the mold, the preformed object (green) is obtained, constituted of agglomerated powder having a "green" density of the order of 1.4 to 1.8, this value depending on the particle size and the crystalline state ($\alpha$, $\beta$ or amorphous form) of the $Si_3N_4$ used for the formulation of the starting composition.

Stages (c) and (d) can be carried out as follows: the green is placed in a graphite crucible provided with a tight fastener (for example of screw type), to reduce any $N_2$ losses by high temperature decomposition, and in order to prevent the green coming into direct contact with the crucible walls during heating, it is embedded in a powder which is inert at high temperature. The powder used can be uncompacted silicon nitride possibly containing boron nitride to prevent the $Si_3N_4$ of this mixture sintering at the temperature used for sintering the part, and thus to facilitate the stripping of the part after cooling. For degassing purposes, it is then heated for about a half hour at around 800° to 1000° C. under a pressure lower than $10^{-1}$ Torr. A protecting atmosphere (for example $N_2$ or $N_2+1\%$ $H_2$) is then introduced, the temperature is raised rapidly to the sintering point, this temperature is maintained for the required time, and finally the whole is allowed to cool. The heating time and sintering temperature are related in the sense that the time is shorter the higher the temperature. Preferably, heating is carried out for about 15 minutes around 1750° C. These conditions are given here only be way of example, but demonstrate the economical importance of the present method. If required, after sintering, the part can be annealed at a temperature (for example of the order of 1600° C.) which stabilizes its microstructure and improves its mechanical properties.

The following Examples illustrate the invention.

EXAMPLE 1

Sintering compositions were prepared by milling together for 168 hours in a $Si_3N_4$ ball mill, using $Si_3N_4$ balls of 4 mm size, the following ingredients: $Si_3N_4$ ($\alpha$-form), SiC, MgO and $Al_2O_3$ in variable proportions. The initial particle size of the compounds was about 0.3 to 1 $\mu$m. The solid to milling fluid (3:1 mixture of petroleum ether and tert butanol) weight ratio was approximately 1:2. After milling, the average particle size was 0.2 $\mu$m. After separating from the milling balls and the milling fluid, the mixtures were formed into objects (plate 60×60×7 mm) by isostatic pressing under 2.5 T/cm² in a hydraulic press and the greens were degassed at 1000° then sintered (temperature rises about 110°/min) for 15 min at specified temperatures comprised between 1600° and 1850° C.

In this Example, the weight amount of SiC in the $Si_3N_4$ was varied from 0% to 17%, total content of MgO and $Al_2O_3$ was varied from 3 to 32%, and MgO/$Al_2O_3$ ratio was varied from 1.5 to 29.

The sintered objects were cut into bars 3.0×4.0×40 mm and subjected the four point flexural rupture test at room temperature (RT), 1200° and 1400° C. in air.

The various opening parameters and the results are shown in Table I. The % of beta-form resulting from the sintering was ascertained by X-ray analysis.

The silicon nitride sintered bodies of the present invention are No. 1 to 10 in Table I, while the comparative examples are No. 11 to 17.

As seen from the results of Table I, the four point flexural strength at 1400° C. is not less than 380 MPa and the density is not less than 3.12 g/cm³ for samples containing 0.5 to 15.0% of SiC in the presence of 4.0 to 25.0% of the total content of MgO and $Al_2O_3$ and MgO/$Al_2O_3$ ratio being 2 to 19 (present invention).

Particularly in preferred embodiments of No. 5, 6, 7, 8 and 9 which have MgO contents from 5 to 15%, $Al_2O_3$ contents from 0.7 to 6% and SiC contents from 1 to 10% according to the present invention, the strength at 1400° C. was excellent, i.e. not less than 470 MPa.

The examples Nos. 11 to 15 which are not covered within the area of the present invention are also shown in Table I for comparative purposes. In the case of No. 16 its density and strength are insufficient, because firing temperature was lower than the present invention. In the case of No. 17, firing temperature was too high, and so its density and strength are insufficient, because of $Si_3N_4$ volatilization.

TABLE I

| Sample No. | Mixing ratio (wt %) $Si_3N_4$ | MgO | $Al_2O_3$ | SiC | MgO + $Al_2O_3$ (wt %) | MgO/$Al_2O_3$ (wt ratio) | Firing temperature (°C.) | Density (g/cm³) | $\beta$-form (%) | flexural strength (MPa) RT | 1200° C. | 1400° C. |
|---|---|---|---|---|---|---|---|---|---|---|---|---|
| Present invention 1 | 94.6 | 4.6 | 0.3 | 0.5 | 4.9 | 15.3 | 1800 | 3.12 | 90 | 650 | 580 | 380 |
| 2 | 78.0 | 19.0 | 1.0 | 2.0 | 20.0 | 19.0 | 1775 | 3.17 | 95 | 700 | 600 | 400 |
| 3 | 65.0 | 23.7 | 1.3 | 10.0 | 25.0 | 18.2 | 1650 | 3.13 | 80 | 600 | 490 | 380 |
| 4 | 86.0 | 3.5 | 0.5 | 10.0 | 4.0 | 7.0 | 1800 | 3.15 | 92 | 640 | 580 | 400 |
| 5 | 89.3 | 5.0 | 0.7 | 5.0 | 5.7 | 7.1 | 1750 | 3.20 | 90 | 730 | 670 | 520 |
| 6 | 83.5 | 14.0 | 1.5 | 1.0 | 15.5 | 9.3 | 1775 | 3.18 | 90 | 740 | 680 | 550 |
| 7 | 73.3 | 15.0 | 1.7 | 10.0 | 16.7 | 8.8 | 1800 | 3.22 | 95 | 750 | 700 | 560 |
| 8 | 74.3 | 14.7 | 6.0 | 5.0 | 20.7 | 2.5 | 1800 | 3.15 | 95 | 740 | 690 | 520 |
| 9 | 84.1 | 7.4 | 3.5 | 5.0 | 10.9 | 2.1 | 1830 | 3.18 | 85 | 700 | 620 | 470 |
| 10 | 60.0 | 16.7 | 8.3 | 15.0 | 25.0 | 2.0 | 1800 | 3.13 | 97 | 650 | 580 | 380 |
| Comparative example 11 | 92.0 | 7.0 | 1.0 | — | 8.0 | 7.0 | 1750 | 3.13 | 70 | 550 | 440 | 330 |
| 12 | 96.0 | 2.9 | 0.1 | 1.0 | 3.0 | 29.0 | 1800 | 2.95 | 82 | 410 | 300 | 280 |
| 13 | 58.0 | 30.5 | 1.5 | 10.0 | 32.0 | 20.3 | 1775 | 3.00 | 92 | 450 | 310 | 280 |
| 14 | 58.0 | 16.7 | 8.3 | 17.0 | 25.0 | 2.0 | 1775 | 3.07 | 95 | 450 | 380 | 270 |
| 15 | 79.0 | 12.0 | 8.0 | 1.0 | 20.0 | 1.5 | 1775 | 3.15 | 95 | 440 | 360 | 240 |
| 16 | 89.3 | 5.1 | 0.6 | 5.0 | 5.7 | 8.5 | 1600 | 2.65 | 60 | 240 | 210 | 200 |

TABLE I-continued

| Sample No. | Mixing ratio (wt %) | | | | MgO + Al₂O₃ (wt %) | MgO/Al₂O₃ (wt ratio) | Firing temperature (°C.) | Density (g/cm³) | β-form (%) | flexural strength (MPa) | | |
|---|---|---|---|---|---|---|---|---|---|---|---|---|
| | $Si_3N_4$ | MgO | $Al_2O_3$ | SiC | | | | | | RT | 1200° C. | 1400° C. |
| 17 | 83.0 | 9.0 | 3.0 | 5.0 | 12.0 | 3.0 | 1850 | 2.95 | 100 | 400 | 320 | 230 |

EXAMPLE 2

The procedure outlined in detail at Example 1 was repeated but using TiN instead of SiC.

In this example, the weight amount of TiN in the $Si_3N_4$ was varied from 0 to 17%, the total content of MgO and $Al_2O_3$ was varied from 2.9 to 30%, and the MgO/$Al_2O_3$ ratio was varied from 1.5 to 28.

The various operating parameters and the results are gathered in Table II. The silicon nitride sintered bodies of the present invention are No. 21 to 30 in Table II, while the comparative examples are No. 31 to 37. As seen from the results of Table II, the four point flexural strength at 1400° C. in air is not less than 380 MPa and the density is not less than 3.11 g/cm³ for sample containing 0.5 to 15.0% of TiN in the presence of 4.0 to 25.0% of the total content of MgO and $Al_2O_3$, and MgO/$Al_2O_3$ ratio being 2 to 19. Particularly in No. 25, 26, 27, 28 and 29 which have MgO content of from 7.5 to 15.0%, and $Al_2O_3$ content of from 0.5 to 6% and a TiN content of from 1 to 10% according to the present invention, the strength at 1400° C. is excellent, i.e. not less than 500 MPa.

The comparative examples No. 31 to 35, which are not covered within the limited composition area of the present invention, are also shown in Table II for comparison. In the case of No. 36 its density and strength are insufficient, because firing temperature was lower than the present invention. In the case of No. 37 firing temperature was too high, and so its density and strength are insufficient, because of $Si_3N_4$ volatilization.

EXAMPLE 3

The procedure outline in detail at Example 1 was repeated but using WC instead of SiC.

In this example, the weight amount of WC in the $Si_3N_4$ was varied from 0 to 17%, the total content of MgO and $Al_2O_3$ was varied from 2.6 to 28%, and the MgO/$Al_2O_3$ ratio was varied from 1.5 to 25.

The various operating parameters and the results are gathered in Table III. The silicon nitride sintered bodies according to the present invention are samples No. 41 to 50 in Table III, while No. 51 to 57 are given as comparative samples. As seen from the results of Table III, the four point flexural strength at 1400° C. in air is not less than 370 MPa and density is not less than 3.12 g/cm³ for the sample containing 0.5 to 15.0% of WC in the presence of 4.5 to 25% of the total contents of MgO and $Al_2O_3$, and with a MgO/$Al_2O_3$ ratio of 2 to 19. Particularly in No. 45, 46, 47, 48 and 49 which have a MgO content varying from 5 to 15%, an $Al_2O_3$ content of from 0.8 to 6% and a WC content of from 1 to 10% according to the present invention, the strength at 1400° C. is excellent and not less than 450 MPa.

The comparative examples No. 51 to 55 which do not refer to the composition area of the present invention are shown in Table III for reference purpose. In case of No. 56 for instance, the density and strength are insufficient, because the firing temperature was below that of the present invention. In case of No. 57, the firing temperature was too high and consequently the density and strength are insufficient because of $Si_3N_4$ volatilization.

TABLE II

| | Sample No. | Mixing ratio (wt %) | | | | MgO + Al₂O₃ (wt %) | MgO/Al₂O₃ (wt ratio) | Firing temperature (°C.) | Density (g/cm³) | β-form (%) | Flexural Strength (MPa) | | |
|---|---|---|---|---|---|---|---|---|---|---|---|---|---|
| | | $Si_3N_4$ | MgO | $Al_2O_3$ | TiN | | | | | | RT | 1200° C. | 1400° C. |
| Present invention | 21 | 93.5 | 5.7 | 0.3 | 0.5 | 6.0 | 19.0 | 1800 | 3.13 | 85 | 650 | 580 | 380 |
| | 22 | 78.0 | 18.8 | 1.2 | 2.0 | 20.0 | 15.7 | 1800 | 3.15 | 87 | 700 | 600 | 400 |
| | 23 | 65.0 | 23.1 | 1.9 | 10.0 | 25.0 | 12.2 | 1650 | 3.11 | 75 | 600 | 490 | 380 |
| | 24 | 86.0 | 3.3 | 0.7 | 10.0 | 4.0 | 4.7 | 1800 | 3.13 | 85 | 640 | 580 | 400 |
| | 25 | 87.0 | 7.5 | 0.5 | 5.0 | 8.0 | 15.0 | 1775 | 3.18 | 81 | 730 | 670 | 520 |
| | 26 | 83.6 | 13.7 | 1.7 | 1.0 | 15.4 | 8.1 | 1830 | 3.13 | 95 | 740 | 680 | 580 |
| | 27 | 74.3 | 14.7 | 6.0 | 5.0 | 20.7 | 2.5 | 1775 | 3.28 | 90 | 740 | 680 | 550 |
| | 28 | 82.0 | 8.8 | 4.2 | 5.0 | 13.0 | 2.1 | 1830 | 3.26 | 95 | 720 | 660 | 530 |
| | 29 | 72.0 | 15.0 | 3.0 | 10.0 | 18.0 | 5.0 | 1750 | 3.18 | 87 | 700 | 620 | 500 |
| | 30 | 62.0 | 15.3 | 7.7 | 15.0 | 23.0 | 2.0 | 1775 | 3.24 | 92 | 650 | 580 | 350 |
| Comparative example | 31 | 92.0 | 7.0 | 1.0 | — | 8.0 | 7.0 | 1750 | 3.13 | 70 | 550 | 440 | 330 |
| | 32 | 96.1 | 2.8 | 0.1 | 1.0 | 2.9 | 28.0 | 1800 | 2.97 | 85 | 410 | 300 | 280 |
| | 33 | 60.0 | 28.6 | 1.4 | 10.0 | 30.0 | 20.4 | 1775 | 3.02 | 93 | 450 | 310 | 280 |
| | 34 | 61.0 | 14.7 | 7.3 | 17.0 | 22.0 | 2.0 | 1775 | 3.06 | 95 | 450 | 380 | 250 |
| | 35 | 79.0 | 12.0 | 8.0 | 1.0 | 20.0 | 1.5 | 1775 | 3.13 | 95 | 440 | 360 | 200 |
| | 36 | 89.0 | 5.3 | 0.7 | 5.0 | 6.0 | 7.6 | 1600 | 2.68 | 65 | 240 | 210 | 200 |
| | 37 | 83.0 | 9.6 | 2.4 | 5.0 | 12.0 | 4.0 | 1850 | 3.00 | 100 | 400 | 320 | 210 |

TABLE III

| | Sample No. | Mixing ratio (wt %) | | | | MgO + Al₂O₃ (wt %) | MgO/Al₂O₃ (wt ratio) | Firing temperature (°C.) | Density (g/cm³) | β-form (%) | Flexural Strength (MPa) | | |
|---|---|---|---|---|---|---|---|---|---|---|---|---|---|
| | | $Si_3N_4$ | MgO | $Al_2O_3$ | WC | | | | | | RT | 1200° C. | 1400° C. |
| Present | 41 | 94.5 | 4.7 | 0.3 | 0.5 | 5.0 | 15.7 | 1800 | 3.12 | 92 | 600 | 550 | 390 |
| ent | 42 | 80.0 | 17.1 | 0.9 | 2.0 | 18.0 | 19.0 | 1775 | 3.16 | 90 | 570 | 520 | 380 |

TABLE III-continued

| Sample No. | | Mixing ratio (wt %) | | | MgO + $Al_2O_3$ (wt %) | $MgO/Al_2O_3$ (wt ratio) | Firing temperature (°C.) | Density (g/cm³) | β-form (%) | Flexural Strength (MPa) | | |
|---|---|---|---|---|---|---|---|---|---|---|---|---|
| | | $Si_3N_4$ | MgO | $Al_2O_3$ | WC | | | | | | RT | 1200° C. | 1400° C. |
| invention | 43 | 65.0 | 23.5 | 1.5 | 10.0 | 25.0 | 15.7 | 1650 | 3.35 | 70 | 550 | 500 | 380 |
| | 44 | 85.5 | 4.0 | 0.5 | 10.0 | 4.5 | 8.0 | 1830 | 3.36 | 93 | 580 | 550 | 380 |
| | 45 | 89.2 | 5.0 | 0.8 | 5.0 | 5.8 | 6.3 | 1750 | 3.25 | 83 | 680 | 650 | 500 |
| | 46 | 85.0 | 12.5 | 1.5 | 1.0 | 14.0 | 8.3 | 1775 | 3.14 | 97 | 730 | 670 | 540 |
| | 47 | 79.9 | 12.1 | 3.0 | 5.0 | 15.1 | 4.0 | 1775 | 3.26 | 93 | 710 | 620 | 530 |
| | 48 | 86.0 | 6.1 | 2.9 | 5.0 | 9.0 | 2.1 | 1800 | 3.33 | 97 | 700 | 620 | 520 |
| | 49 | 69.0 | 15.0 | 6.0 | 10.0 | 21.0 | 2.5 | 1750 | 3.41 | 93 | 650 | 600 | 450 |
| | 50 | 64.0 | 14.0 | 7.0 | 15.0 | 21.0 | 2.0 | 1800 | 3.43 | 95 | 580 | 500 | 370 |
| Comparative example | 51 | 92.0 | 7.0 | 1.0 | — | 8.0 | 7.0 | 1750 | 3.13 | 70 | 550 | 440 | 330 |
| | 52 | 96.4 | 2.5 | 0.1 | 1.0 | 2.6 | 25.0 | 1800 | 3.04 | 87 | 410 | 320 | 270 |
| | 53 | 62.0 | 26.4 | 1.6 | 10.0 | 28.0 | 16.5 | 1775 | 3.35 | 94 | 460 | 330 | 250 |
| | 54 | 62.0 | 14.0 | 7.0 | 17.0 | 21.0 | 2.0 | 1775 | 3.50 | 96 | 440 | 350 | 230 |
| | 55 | 83.0 | 9.6 | 6.4 | 1.0 | 16.0 | 1.5 | 1750 | 3.24 | 83 | 440 | 340 | 200 |
| | 56 | 88.0 | 6.0 | 1.0 | 5.0 | 7.0 | 6.0 | 1600 | 2.88 | 67 | 270 | 230 | 200 |
| | 57 | 85.0 | 8.0 | 2.0 | 5.0 | 10.0 | 4.0 | 1850 | 3.17 | 100 | 400 | 330 | 250 |

EXAMPLE 4

The procedure outlined in detail at Example 1 was repeated but using TiC or $TiB_2$ instead of SiC.

In this example, the weight amount of TiC or $TiB_2$ in the $Si_3N_4$ was 1 to 5%, the total content of MgO and $Al_2O_3$ was 5.7 or 15.5% and $MgO/Al_2O_3$ ratio was 7 or 9.3.

The various operating parameters and the results are gathered in Table IV. The silicon nitride sintered bodies of the present invention are No. 61 to 64 in Table IV, while No. 65 is given for comparison. As seen from the results of Table IV, the four point flexural strength at 1400° C. in air is not less than 400 MPa and the density is not less than 3.12 g/cm³ for the samples containing 1.0 or 5.0% of TiC or $TiB_2$ in the presence of 5.7 or 15.5% of the total contents of MgO and $Al_2O_3$, and with a $MgO/Al_2O_3$ ratio of 7 or 9.3.

TABLE IV

| Sample No. | | Mixing ratio (wt %) | | | | | MgO + $Al_2O_3$ (wt %) | $MgO/Al_2O_3$ (wt ratio) | Firing temperature (°C.) | Density (g/cm³) | β-form (%) | Flexural strength (MPa) | | |
|---|---|---|---|---|---|---|---|---|---|---|---|---|---|---|
| | | $Si_3N_4$ | MgO | $Al_2O_3$ | TiC | $TiB_2$ | | | | | | RT | 1200° C. | 1400° C. |
| Present invention | 61 | 89.3 | 5.0 | 0.7 | 5.0 | — | 5.7 | 7.1 | 1750 | 3.24 | 80 | 630 | 570 | 450 |
| | 62 | 83.5 | 14.0 | 1.5 | 1.0 | — | 15.5 | 9.3 | 1800 | 3.12 | 97 | 620 | 580 | 480 |
| | 63 | 89.3 | 5.0 | 0.7 | — | 5.0 | 5.7 | 7.1 | 1750 | 3.13 | 88 | 590 | 560 | 400 |
| | 64 | 83.5 | 14.0 | 1.5 | — | 1.0 | 15.5 | 9.3 | 1800 | 3.12 | 85 | 610 | 520 | 420 |
| Comparative example | 65 | 92.0 | 7.0 | 1.0 | — | — | 8.0 | 7.0 | 1750 | 3.13 | 70 | 550 | 440 | 330 |

We claim:

1. Silicon nitride sintered bodies which contain metal compounds selected from SiC, TiN, WC, TiC and $TiB_2$, and $MgO/Al_2O_3$, characterized in having such metal compounds in a quantity by weight not exceeding 15%, the total amounts of MgO and $Al_2O_3$ in a quantity by weight of 4 to 25% relative to the total of the composition and in having the $MgO/Al_2O_3$ weight ratio from 19 to 2.

2. Silicon nitride sintered bodies according to claim 1, wherein the amount of metal compound selected from SiC, TiN and WC is 1 to 10% by weight, the amount of MgO is 5 to 15% by weight and the amount of $Al_2O_3$ is 0.5 to 6% by weight.

3. Silicon nitride sintered bodies according to claim 1, characterized in that their density exceeds 3.10 g/cm³ and their flexural strength at 1400° C. is not less than 350 MPa.

4. A method of manufacturing silicon nitride sintered bodies by the pressureless sintering of a composition in powder form, which comprises mixing a raw material powder of silicon nitride containing magnesium oxide and aluminium oxide and a metal compound selected from SiC, TiN, WC, TiC and $TiB_2$, the total amounts of MgO and $Al_2O_3$ being 4 to 25% by weight of the composition and the $MgO/Al_2O_3$ weight ratio being from 19 to 2, forming the resulting mixture into an article and firing this article at a temperature of 1650°–1830° C. in an atmosphere composed essentially of nitrogen.

* * * * *